H. C. NEUBERGER & F. P. BERGH.
PROCESS OF TREATING STARCH, &c.
APPLICATION FILED APR. 28, 1911. RENEWED NOV. 19, 1912.
1,047,831.
Patented Dec. 17, 1912.
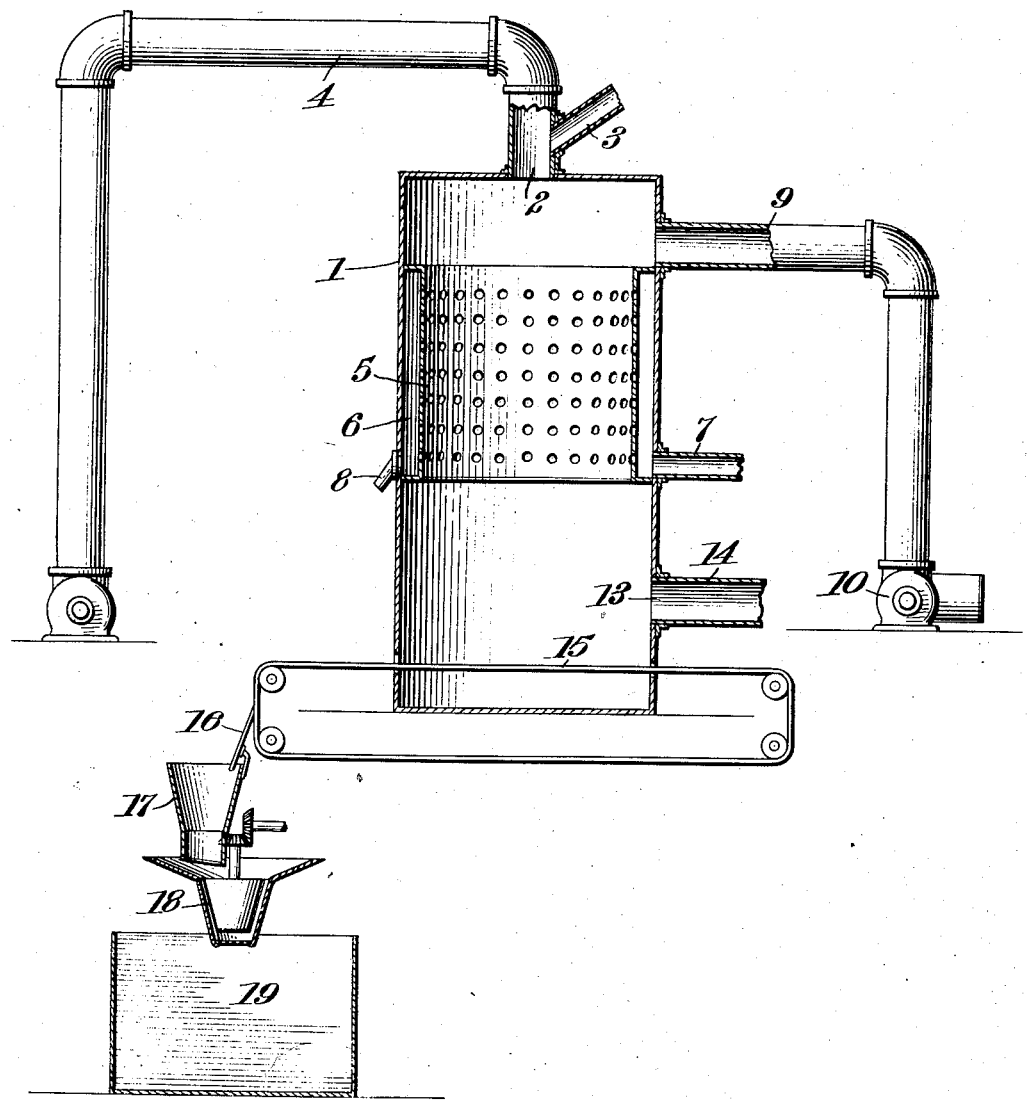

UNITED STATES PATENT OFFICE.

HENRY C. NEUBERGER AND FREDERICK PENTZ BERGH, OF NEW YORK, N. Y., ASSIGNORS, BY MESNE ASSIGNMENTS, TO GENERAL REDUCTION COMPANY, A CORPORATION OF NEW YORK.

PROCESS OF TREATING STARCH, &c.

1,047,831.  Specification of Letters Patent.  Patented Dec. 17, 1912.

Application filed April 28, 1911, Serial No. 623,951. Renewed November 19, 1912. Serial No. 732,293.

*To all whom it may concern:*

Be it known that we, HENRY C. NEUBERGER and FREDERICK P. BERGH, citizens of the United States, and residents of New York, in the county of New York and State of New York, have invented certain new and useful Improvements in Processes of Treating Starch, &c., of which the following is a specification.

Our invention relates to a process of drying and transforming starch or similar organic substances from a powdered form to a condition of gritty, dry, angular particles capable of being readily conveyed and elevated without dispersion and consists of certain improvements upon the process and apparatus described in our co-pending application, Serial Number 623,921, filed April 28, 1911.

The process consists, generally stated, of introducing starch in a powdered form containing moisture preferably of the amount usually contained in green starch into contact with a body of live steam or other moisture-carrying heated gaseous body and dropping the starch through said gaseous body into a body of heated dry air below the steam or equivalent body. By this process the product is cooked in its own moisture so as to wholly or partly gelatinize the same and it is then immediately dried so as to reduce the gelatinized particles thrown down from the gelatinizing zone, thus fixing the particles in a hard, dry, gritty form. Following the drying of the particles, they are conveyed to a suitable disintegrator where they are broken to the desired degree of fineness and the starch is then ready for such commercial use as the ordinary green starch may be applied to and may be handled and elevated without difficulty.

In the accompanying drawing which shows a central, vertical, section view, an apparatus is illustrated capable of carrying this process into effect.

Referring to the drawing, 1 is a closed vessel constituting a gelatinizing and drying chamber and 2 is an opening through which the material in a powdered form is introduced. A spout or pipe 3 for the introduction of the material leads to this opening and a pipe 4 also leads thereto for the purpose of admitting air under pressure, the object of which is to oppose the pressure of the steam within the chamber and prevent the latter from blowing the powder backward through the entrance. The entrance 2 is at the top of the chamber. The starch to be treated is preferably in a green condition in which state it contains about 25% moisture or if such moisture has been previously extracted, sufficient moisture is added to the powder to approximate such percentage. As the starch is introduced, it falls into contact with a body of moisture-carrying gaseous matter composed of the air admitted to the chamber and of live steam admitted through vertically extending perforated wall 5. The wall 5 projects from the wall of the vessel and forms in conjunction with such wall a steam chamber 6. The steam is admitted to the lower part of this chamber through inlet 7 and rises through the chamber and passing through the perforations enters the chamber where it comes in contact with the falling body of the powdered starch. The wall 5 constitutes baffling means to distribute the steam and to separate from the steam any excess moisture carried thereby. Steam chambers may be on opposite sides of the vessel or the single steam chamber extending around the wall of the vessel may be provided. The water separated from the steam may be drawn off by means of a drip pipe 8 at the bottom of the steam chamber. The exhaust steam is drawn out from the upper end of the chamber through a pipe 9 communicating with a suitable blower or suction fan 10.

Below the steam inlet or inlets and in the lower part of the vessel there is provided in the wall of said vessel an opening 13 to which leads a pipe 14 communicating with a suitable source of heated air, whereby the body of such air is introduced into the lower part of said chamber immediately below the body of steam or other moisture-carrying heated gaseous body. As the powder strikes the body of steam it is subjected to a temperature of about 180° F. and the action of this heat in conjunction with the moisture carried by the starch and the moisture supplied by the steam gelatinizes wholly or partly the starch. Such gelatinization, however, is insufficient to reduce the starch to a paste or jelly and the same is broken into fine agglomerated particles by the current of steam and falls into the body of drying air where such particles are separated and fixed in a hard, gritty, dry form. The starch in such form is received upon an endless conveying belt 15, extending horizontally across the chamber at or near the bottom thereof and continuously driven by any suitable power means. The starch is carried by this conveyer out of the chamber and against a scraping and guiding chute 16, which scrapes the starch from the conveyer and delivers it into a hopper 17 which leads to a suitable disintegrator 18 where the starch is ground to the desired mesh and from which it passes to a collecting receptacle 19. In its final form, the starch will be in a dry, hard, gritty state characterized by an angular formation and a vitreous surface.

Having thus described our invention, what we claim is:—

1. The process of treating starch and similar organic substances, which consists in introducing the substance in a powdered state containing moisture into contact with a heated moisture-carrying gaseous body and dropping the starch through said body into a heated gaseous drying body immediately below the moisture carrying gaseous body, substantially as described.

2. The process of treating starch and similar organic substances, which consists in introducing the substance in a powdered form containing moisture in the upper part of a closed vessel and dropping the substance through a gaseous moisture-carrying body into and through a dry heated gaseous body immediately below the moisture-carrying gaseous body, and continuously conveying said starch from said chamber, substantially as described.

3. The process of transferring starch from a powdered form to a dry, gritty state, which consists in introducing the starch in a powdered form containing moisture into contact with a moisture-carrying heated gaseous body of a temperature sufficient to gelatinize said starch and dropping the gelatinized particles into and through a body of dry heated gaseous matter immediately below the moisture-carrying gaseous body, substantially as described.

Signed at New York, in the county of New York, and State of New York, this 24th day of April A. D. 1911.

HENRY C. NEUBERGER.
FREDERICK PENTZ BERGH.

Witnesses:
W. M. RYSER,
DAVID M. NEUBERGER.